(12) United States Patent
Kotzalas et al.

(10) Patent No.: US 6,666,585 B1
(45) Date of Patent: Dec. 23, 2003

(54) UNITIZED CAGE FOR CYLINDRICAL ROLLER BEARING

(75) Inventors: Michael N. Kotzalas, Canton, OH (US); Patrick M. Linet, North Canton, OH (US); Russell E Smith, Jr., Alliance, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/199,264

(22) Filed: Jul. 19, 2002

(51) Int. Cl.[7] .............................................. F16C 33/46
(52) U.S. Cl. .............. 384/578; 29/898.065; 29/898.064
(58) Field of Search ................................ 384/578, 579, 384/560, 572; 29/898.065, 898.064

(56) References Cited

U.S. PATENT DOCUMENTS

| | | |
|---|---|---|
| 3,388,952 A | 6/1968 | Schaeffler |
| 3,438,685 A | 4/1969 | Teufel |
| 3,442,562 A | 5/1969 | Schaeffler et al. |
| 3,647,273 A | 3/1972 | Pfaffenberger |
| 4,435,024 A | 3/1984 | Tagawa et al. |
| 4,952,079 A | 8/1990 | Lingner |

OTHER PUBLICATIONS

Patent Abstract of Japan, Application No. 11180408, Date Jun. 25, 1999.
Patent Abstract of Japan, Application No. 10233479, Date Aug. 6, 1998.

*Primary Examiner*—Lenard A. Footland
(74) *Attorney, Agent, or Firm*—Polster, Lieder, Woodruff & Lucchesi, L.C.

(57) ABSTRACT

A unitized cage for cylindrical roller bearings wherein the inner raceway of the bearing configuration may be the rotating or stationary shaft component and the outer raceway of the bearing configuration may be the rotating or stationary housing component. Thus, a bearing configuration can be generated without the need for a separate inner or outer race having inner or outer raceways. The unitized cage comprises a cage nest having end face axial projections and a cage finger ring having fingers which engage the end face axial projections to lock the cage nest into position on the cage finger ring. A plurality of cylindrical rollers can be positioned within the cage pockets of the cage nest prior to the assembly of the cage nest with the cage finger ring to generate a cylindrical roller bearing.

20 Claims, 2 Drawing Sheets

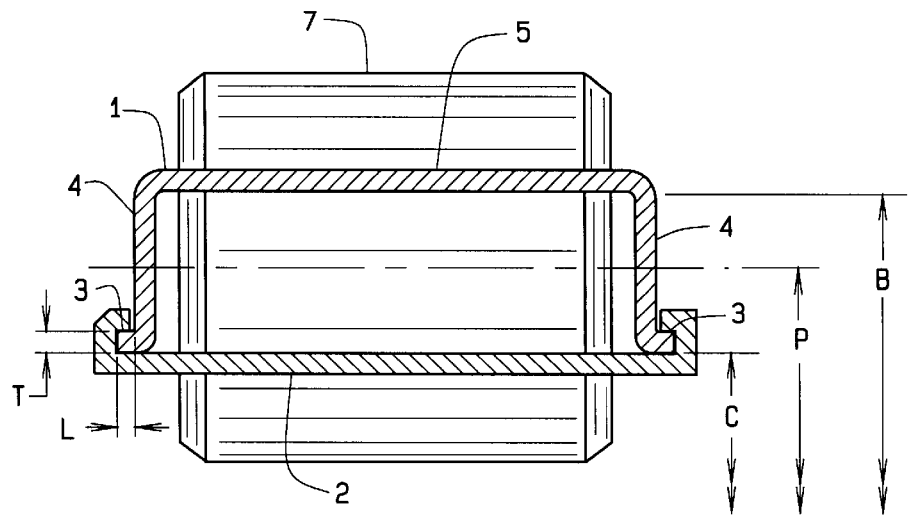
FIG. 4
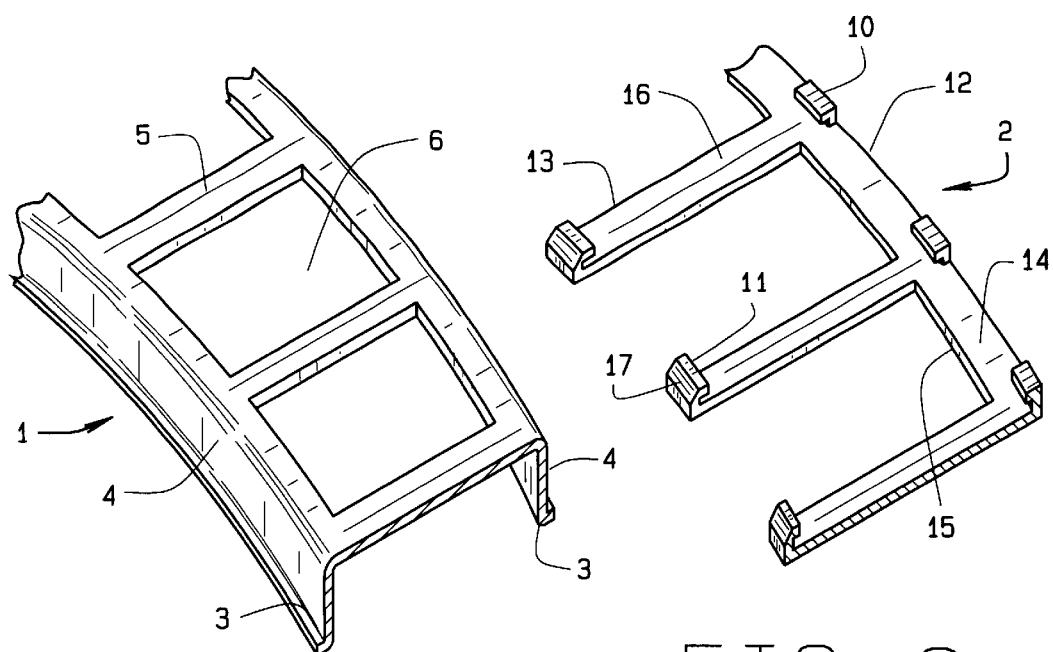
FIG. 2
FIG. 3

UNITIZED CAGE FOR CYLINDRICAL ROLLER BEARING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates in general to a cage for a roller bearing, more particularly, to a unitized cage for a cylindrical roller bearing.

2. Description of Related Art

In applications where the bearing shaft and housing can be hardened and ground to roller bearing specifications, the use of cylindrical rollers without the inner and outer ring can reduce the section height and weight requirements of the power transmission component. In such applications, there is no need for the inner and outer rings because the bearing raceways which would normally be found in the inner and outer rings is now found on the surfaces of the shaft or the housing for the bearing.

One typical application that utilizes this arrangement are heavy industrial planetary gearboxes, where the planet pin and gear bore are hardened and ground to act as the bearing raceways. In this configuration, the cylindrical rollers can be used with or without a cage. When used without a cage, the speeds are usually lower, to prevent scuffing damage between the cylindrical roller bodies. Also, roller skewing is not as tightly controlled, which can cause problems at higher speeds. The unitizing cage of the present invention spaces the cylindrical rollers to prevent scuffing of the roller bodies and prevents skewing, all of which, if not prevented, can lead to reduced bearing performance. Finally, when the cylindrical rollers are not unitized with a cage, the assembly of the final gearbox is considerably more time consuming and costly than when a cage unitizes the cylindrical rollers.

To unitize the cylindrical roller cage assembly, several configurations have been used. Most commonly, machined steel separators are placed between the rollers, and then fixed to two end rings with rivets or pins, thus holding the assembly together. Because the separators are machined from a solid piece of metal, they are expensive to manufacture. Also, they require several steps to assemble due to the forming of a head on the rivets or welding of pins. U.S. Pat. Nos. 3,647,273 and 4,435,024 are representative of these types of cages.

While this invention may be similar in some aspects to the U.S. Pat. No. 4,435,024, the present invention is designed to be used without bearing rings. Without bearing rings, the cage design must be stronger to prevent roller skewing, to allow for roller separation during extreme operating conditions, and to allow roller retention during initial assembly and assembly/disassembly for routine maintenance.

In U.S. Pat. No. 4,435,024 the cage was designed to simplify the manufacturing and assembly of a standard stamped steel cage used in a bearing with an inner and outer ring. One of the bearing rings in that patent contains two ribs to axially locate the rollers and prevent roller skewing. However, unlike the present invention, the previous patent would not be sufficiently strong for unitizing the rollers without bearing rings.

Other past configurations use two pins without the machined separator, however, this is still expensive to manufacture with the welding operation of the pins. Still other past configurations require intricate forming of sheet metal which might not have the strength to maintain their shape during severe operation, and are expensive to manufacture due to the complex shape.

SUMMARY OF THE INVENTION

The present invention overcomes these and other problems by providing a lower cost unitized cage for cylindrical roller bearings which maintains the alignment of cylindrical rollers.

The present invention resides in a unitized cage which incorporates a cage nest and a cage finger ring. The cage nest has a number of projections which allow the cage finger ring to be inserted onto and clamped into place by the cage nest. Additionally, the cage nest and cage finger ring can be manufactured from sheet steel or high strength polymer, and the two pieces do not have to be made from the same material for a given assembly: e.g., metal cage nest and polymer cage finger ring.

The present invention offers a number of advantages. The configuration of the cage nest is strong enough axially to control roller skewing and axially position the rollers. The cage nest-cage finger ring unitizing mechanism is strong enough to hold through harsh operating conditions, thus allowing for disassembly of the component and routine maintenance to occur. The cage nest and cage finger ring also have a simple geometry which allows for easy molding of the cage components from high strength polymer or stamping and forming from sheet metal for economical manufacturing. The subassembly can also be delivered "pre-greased" to allow for simplification of the end user's machine assembly. For this arrangement, the grease would be packed into the cage (around the rolling elements) and the subassembly would then be vacuum-sealed in a plastic bag to retain the grease during shipping.

The present invention also resides in the various embodiments of the above invention.

DESCRIPTION OF THE DRAWINGS

FIG. 2 is an isometric view of the cage nest of the present invention.

FIG. 3 is an isometric view of the cage finger ring of the present invention.

FIG. 4 is a sectional view of the present invention.

Corresponding reference characters indicate corresponding parts throughout the several views of the drawings.

DETAILED DESCRIPTION OF THE INVENTION

Figure 1:
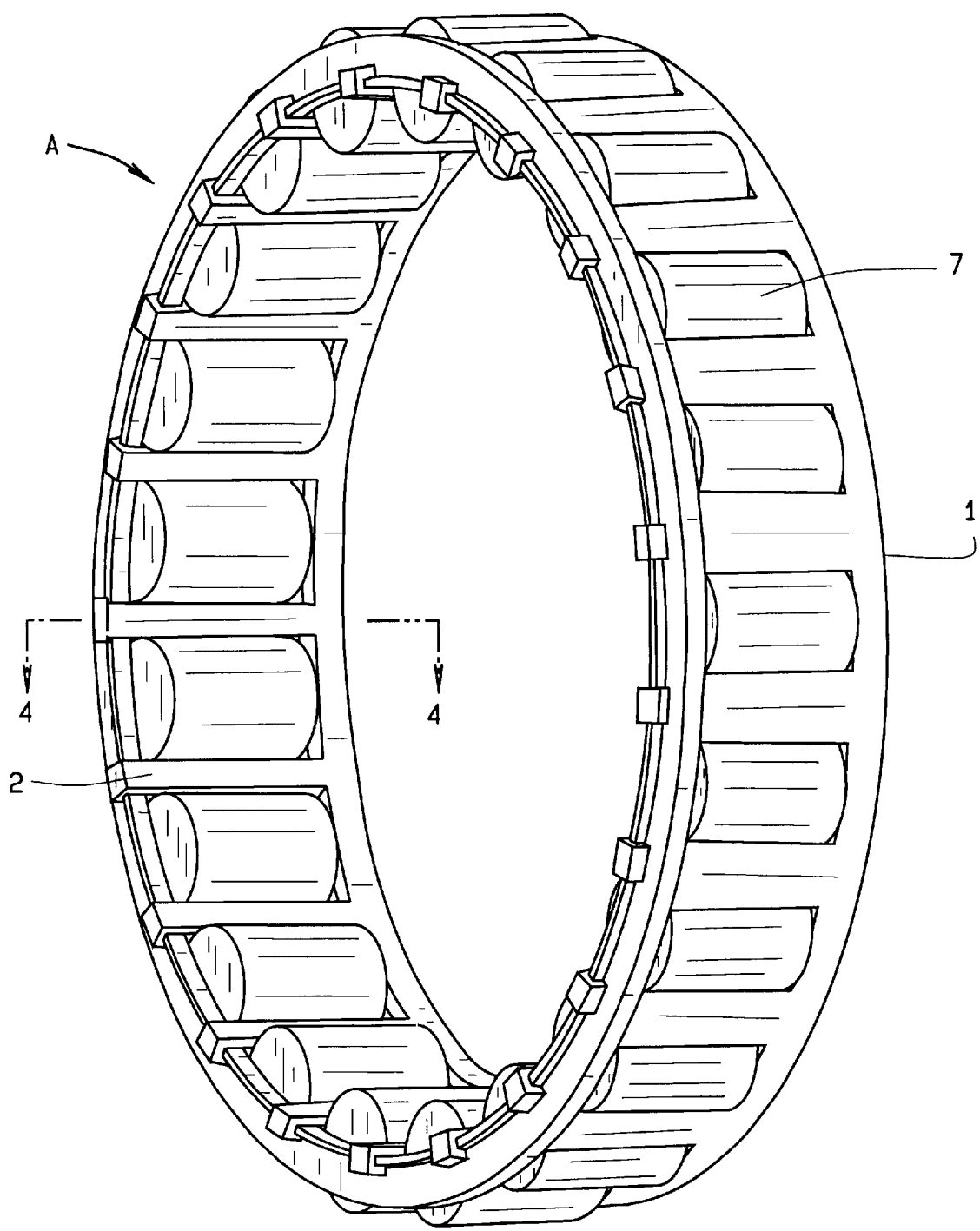
FIG. 1 is an isometric view depicting the present invention as used in a cylindrical roller bearing without rings.

Referring now to the drawings, FIG. 1, a unitized cage A is shown. The unitized cage A has a cage nest 1 and a cage finger ring 2 which are used to contain and align a plurality of cylindrical rollers 7. The cage nest 1 in FIG. 2 is shaped in the form of an annular ring having an axis X and has a cross section which is generally hat-shaped. The hat-shape is created by two end face axial projections 3 having a length L and a thickness T, two end faces 4, and an upper section 5. The two end faces 4 extend radially from the axis X and are generally perpendicular to the two end face axial projections 3. In an alternative embodiment, the two end faces are not generally perpendicular to the two end face axial projections 3. The two end faces 4 are connected together by the upper section 5.

The upper section 5 has a plurality of cage pockets 6 sized and located dimensionally to allow for the insertion of the plurality of cylindrical rollers 7. The shape and size of the plurality of cage pockets 6 is such as to allow the cylindrical rollers 7 to rotate freely, but without undue dislocation of each of the individual cylindrical rollers 7 within its related cage pocket 6. The longitudinal dimension of the cage pockets 6 is slightly greater than the axial length of the cylindrical rollers 7, the width of the cage pockets 6 is less than the diameter of the cylindrical rollers 7, thereby retaining the rollers between the cage nest 1 and the cage finger ring 2 when those components are assembled. The orientations of the cage pockets 6 are such that the longitudinal axis of each of the plurality of cylindrical rollers 7 is parallel to the axis of the cage nest 1.

Although the cage nest 1 of the preferred embodiment is hat-shaped, other sectional configurations are acceptable such as, for example, a trapezoidal shape. In fact, the cage nest may be of any cross sectional shape provided the shape selected has end face axial projections having a length L and a thickness T, and includes a plurality of cage pockets 6 as described herein.

The cage finger ring 2 in FIG. 4 is generally in the shape of an annular ring having an axis which coincides with axis X of the cage nest 1. The cage finger ring 2 includes a ring 12 which has an upper surface 14, an edge 15, and a plurality of cage finger bridges 16. The cage finger ring 2 also has a set of cage fingers 10 and a set of cage bridge fingers 11.

The set of cage fingers 10 projects outwardly from the upper surface 14 of the cage finger ring 2. The set of cage fingers 10 is generally L-shaped with the vertical leg of the L-shape connected to the upper surface 14. The horizontal leg of the L-shape is parallel to the upper surface 14. The set of cage fingers 10 are spaced apart around the upper surface 12 of the cage finger ring 2 at intervals which are about the same as the spacing of the cage pockets 6 of the cage nest 1. As in the case of the cage nest 1, the longitudinal dimension of the cage fingers 10 is greater than the axial length of the cylindrical rollers 7 and the width of the spaces between the cage fingers 10 is less than the diameter of the cylindrical rollers 7, thereby retaining the rollers between the cage nest 1 and the cage finger ring 2 when those components are assembled.

In the case of both the set of fingers 10 and the set of cage bridge fingers 11, the horizontal edge of each L-shape is sized to match the length L of the end face axial projections 3 such that the end face axial projections engage within the L-shape of the fingers. Additionally, the vertical leg of the set of fingers 10 and the set of cage bridge fingers 1 1 are sized to match the thickness T of the end face axial projections 3 to allow locking engagement of the set of cage fingers 10 and the set of cage bridge fingers 11 with the end face axial projections 3.

Attached to the edge 15 of the ring 12 is a set of cage finger bridges 13. The cage finger bridges 13 project axially from the edge 15 of the ring 12, and the cage finger bridges 13 terminate in the set of cage bridge fingers 11. The set of cage bridge fingers 11 are also L-shaped with the vertical leg of the L-shape connected to the top surface 16 of the cage finger bridges 13 and the horizontal leg of the L-shape are parallel to the upper surface 16. The outside corner of each the L-shape of the cage bridge fingers 11 has a chamfer 17. It will be appreciated that the set of cage fingers 10 are in alignment with the set of cage bridge fingers 11 such that the centerline of the horizontal leg of the L-shape of the set of cage fingers 10 aligns with the centerline of the horizontal leg of the L-shape of the set of cage bridge fingers 11. The spacing of the cage finger bridges 13 is configured to match the location of the cage pockets 6 of the cage nest 1 such that when the cage nest 1 and the cage finger ring 2 are assembled, the cylindrical rollers 7 are captivated within the cage pockets 6 and the gaps between the cage finger bridges 13.

Referring to FIG. 4, it is noted that the diameter B of the cage nest 1 is larger than the pitch diameter P of cylindrical rollers, and the diameter C of the cage finger ring 2 is smaller than the pitch diameter P of the cylindrical rollers 7.

The cage nest 1 and cage finger ring 2 can be manufactured from sheet metal or high strength polymer. Additionally, the two pieces do not have to be made from the same material for a given assembly; e. g., the cage nest 1 could be made of metal and the cage finger ring 2 can be made of a high strength polymer.

The components of the unitized cage can be assembled in any manner that allows the cylindrical rollers 7 to be positioned and retained within the cage pockets 6 after the end face axial projections 3 of the cage nest 1 have been placed into and captured by the set of cage fingers 10 and the set of cage bridge fingers 11 of the cage finger ring 2. However, in the preferred embodiment and in the preferred method of assembly of the unitized cage A, the cage nest 1 is placed within special tooling such that an end face 4 of the cage nest is pointing upward. The tooling has a circular cut in the center to allow the cage finger bridges 13 and end face axial projections 3 to protrude within. The cylindrical rollers 7 are then positioned within the cage pockets 6 of the cage nest. The cage finger ring 2 is positioned such that the cage finger bridges 13 are spaced between the cylindrical rollers 7. The chamfer 17 on the outer corners of the set of cage bridge fingers 11 allow the cage finger bridges 13 to engage with the matching end face axial projection 3 of the cage nest 1. The cage finger ring 2 is snapped into place by pushing the ring 12 of the cage finger ring onto one end face axial projection 3 from the end face 4 of the cage nest 1. During this operation, the set of cage bridge fingers 11 is being driven around the other end face axial projection 3 of the cage nest 1, thereby locking the cage nest into place onto the cage finger ring 2. FIG. 4 shows the position of the components of the unitized cage A after assembly.

While the above description describes various embodiments of the present invention, it will be clear that the present invention may be otherwise easily adapted to fit any configuration where a unitized cage may be utilized.

As various changes could be made in the above constructions without departing from the scope of the invention, it is intended that all matter contained in the above description or shown in the accompanying drawings shall be interpreted as illustrative and not in a limiting sense.

What is claimed is:

1. A unitized cage for organizing cylindrical rollers, comprising:
   a cage nest having a plurality of cage pockets and opposing end face axial projections; and
   a cage finger ring having a set of fingers for locking engagement with the end face axial projections of the cage nest.

2. The unitized cage of claim 1 wherein the cage nest is in the form of a hat-shape.

3. The unitized cage of claim 2 wherein the hat-shape of the cage nest includes the end face axial projections, an upper section, and two end faces connected by the upper section.

4. The unitized cage of claim 3 wherein the cage finger ring further comprises a plurality of cage finger bridges.

5. The unitized cage of claim 4 wherein the set of fingers includes a set of cage fingers and a set of cage bridge fingers.

6. The unitized cage of claim 5 wherein the cage finger ring has an upper surface and an edge, and wherein the set of cage fingers is in the form of a first L shape and the set of cage fingers project outwardly from the upper surface such that the vertical leg of the first L shape is connected to the upper surface and the horizontal leg of the first L shape is horizontal to the upper surface.

7. The unitized cage of claim 6 further comprising a plurality of cage finger projections.

8. The unitized cage of claim 7 wherein each of the cage finger projections comprises a finger bridge and a cage bridge finger, wherein the finger bridge has a first end, a second end, and a top surface, and wherein the first end is connected to the edge of the cage finger ring such that the finger bridge projects axially from the edge.

9. The unitized cage of claim 8 wherein the cage bridge finger is connected to the second end of the finger bridge, wherein the cage bridge finger is in the form of a second L shape, wherein the vertical leg of the second L shape is connected to the top surface of the finger bridge, and wherein the horizontal leg of the second L shape is parallel with the top surface of the finger bridge.

10. The unitized cage of claim 9 wherein the set of cage fingers is in alignment with the set of cage bridge fingers such that an axial centerline of the horizontal leg of the first L shape is in substantial alignment with an axial centerline of the horizontal leg of the second L shape.

11. The combination of the unitized cage of claim 10 and a plurality of cylindrical rollers.

12. The combination of claim 11 wherein the spacing of the cage finger projections are configured to match the location of the plurality of cage pockets in the cage nest such that when the cage nest and the cage finger ring are assembled, the plurality of cylindrical rollers are captivated between the cage nest and the cage finger ring in a manner which allows the plurality of cylindrical rollers to rotate freely while still retaining the axial alignment of each cylindrical roller in each of the cage pockets.

13. The unitized cage of claim 10 wherein the cage nest is made from one of either metal or high strength polymer.

14. The unitized cage of claim 10 wherein the cage finger ring is made from one of either metal or high strength polymer.

15. The unitized cage of claim 10 wherein an outside corner of the second L shape has a chamfer.

16. A unitized cage for organizing cylindrical rollers, comprising:
   a cage nest having a plurality of cage pockets;
   a cage finger ring; and
   means for engaging the cage nest with the cage finger ring such that a plurality of cylindrical rollers is captivated and kept in axial alignment by the cage nest and the cage finger ring, and which allow each of the plurality of cylindrical rollers to rotate freely within one of the plurality of cage pockets.

17. The unitized cage of claim 16 wherein the cage nest is in the form of a hat-shape.

18. The unitized cage of claim 17 wherein the cage nest is made from one of either metal or high strength polymer.

19. The unitized cage of claim 17 wherein the cage finger ring is made from one of either metal or a high strength polymer.

20. A method of organizing cylindrical rollers, comprising:
   manufacturing a cage nest wherein the cage nest includes a plurality of cage nest pockets capable of retaining a plurality of cylindrical rollers and wherein the cage nest includes means for engagement with a cage finger ring;
   manufacturing the cage finger ring wherein the cage finger ring includes means for locking engagement with the cage nest; and
   assembling the cage nest, the cage finger ring, and the plurality of cylindrical rollers to lockingly engage the cage nest with the cage finger ring such that the plurality of cylindrical rollers is captivated within the cage nest and the cage finger ring in a manner which allows each of the plurality of cylindrical rollers to rotate freely within one of the plurality of cage nest pockets while maintaining the axial alignment of the cylindrical roller within the cage nest pocket.

* * * * *